(No Model.) 3 Sheets—Sheet 1.
W. & B. F. BADER.
HAY RAKE AND LOADER.
No. 357,446. Patented Feb. 8, 1887.
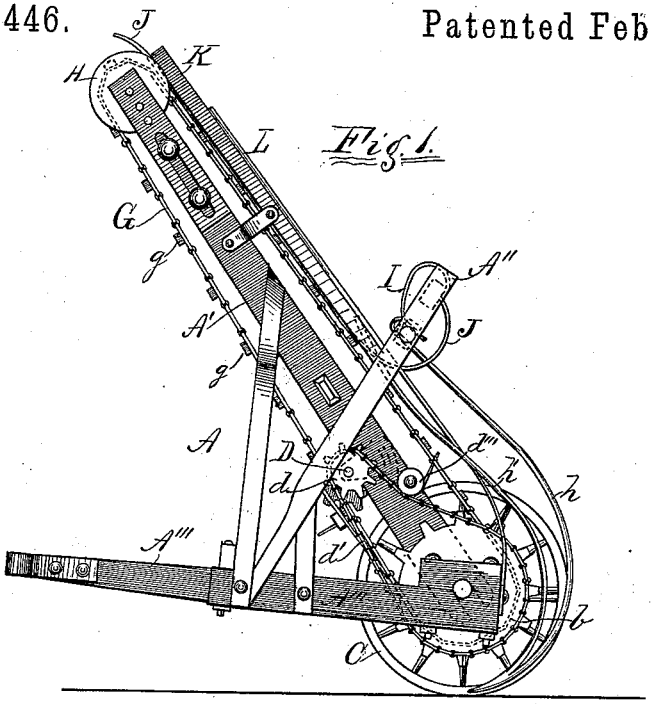
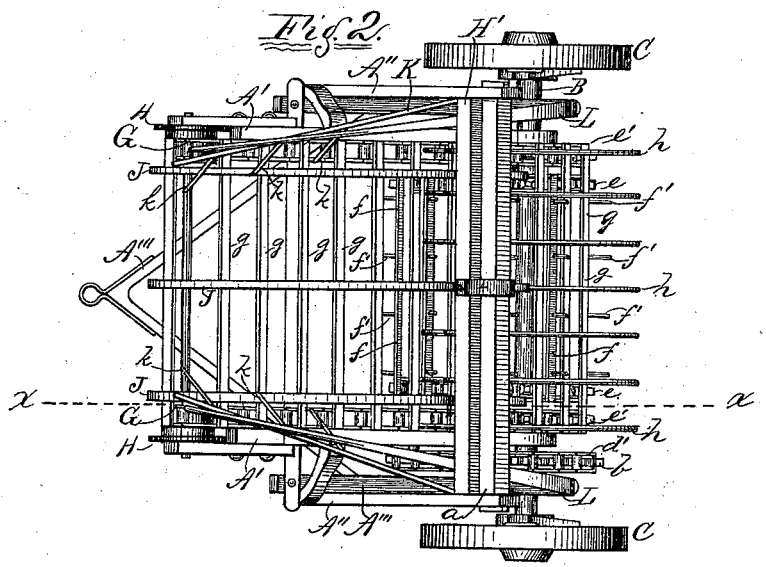
Witnesses:
P. R. Richards.
Thos. S. Ivison.
Inventors:
William Bader,
Benjamin F. Bader,
By W. B. Richards
Atty.

(No Model.) 3 Sheets—Sheet 2.
W. & B. F. BADER.
HAY RAKE AND LOADER.
No. 357,446. Patented Feb. 8, 1887.
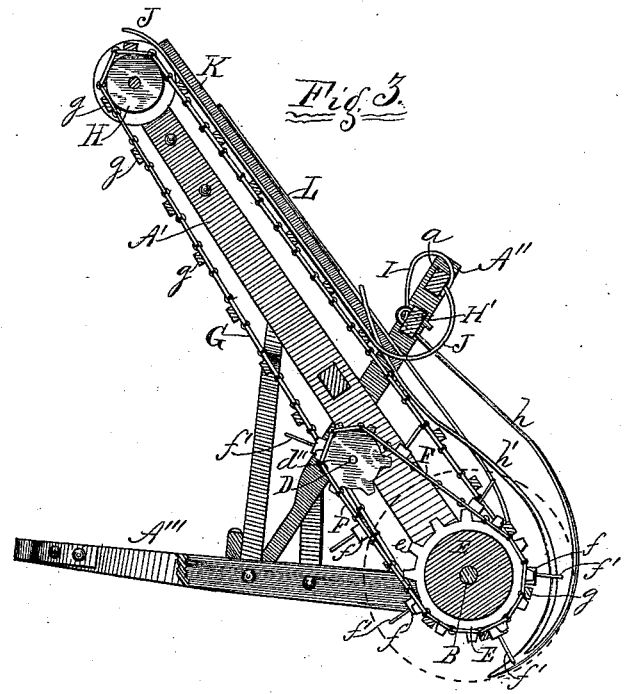
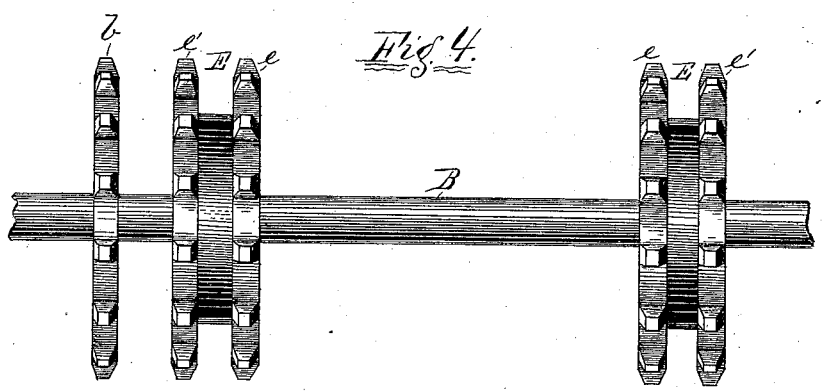
Witnesses:
P. R. Richards.
Thos. S. Ivison.
Inventors:
William Bader,
Benjamin F. Bader.
By W. & B. Richards,
Atty.

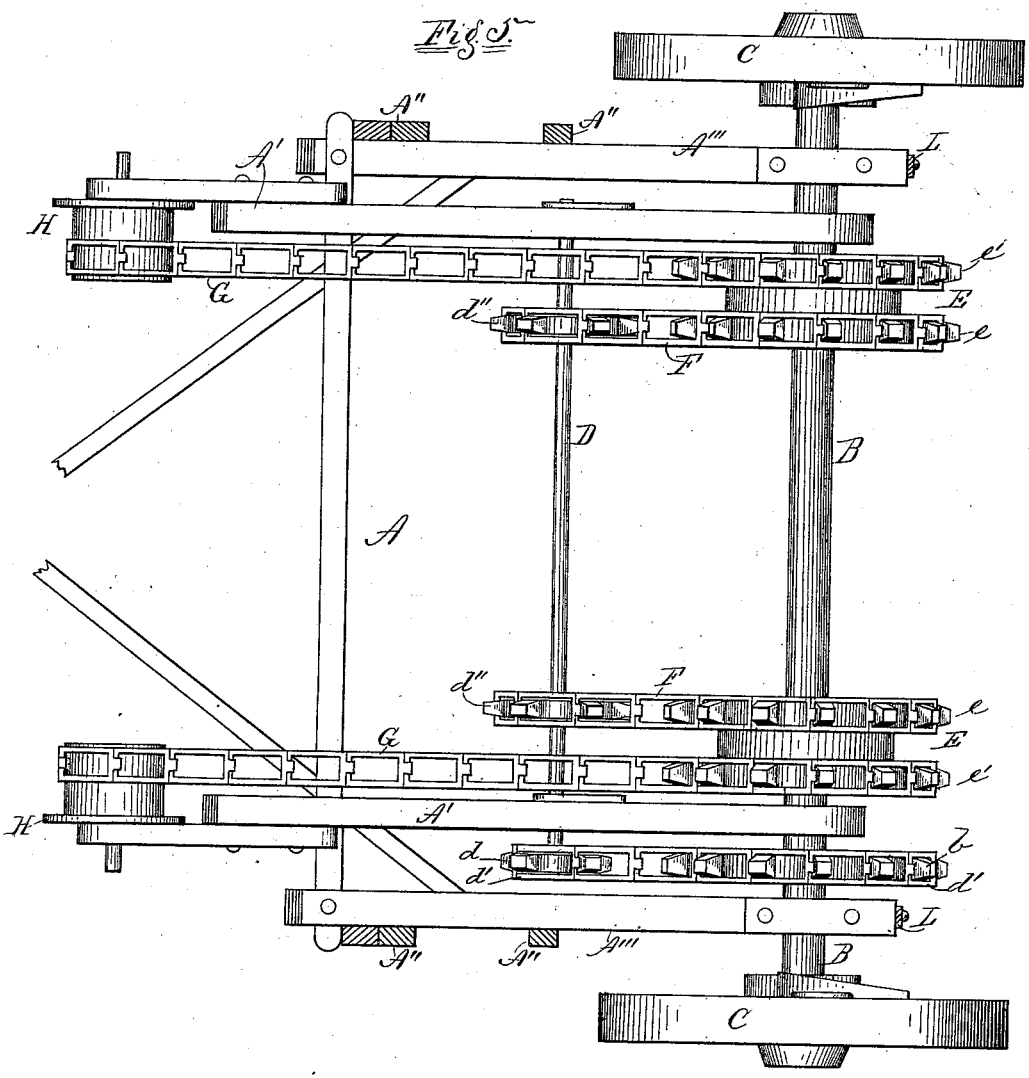

UNITED STATES PATENT OFFICE.

WILLIAM BADER AND BENJAMIN F. BADER, OF BADERS, ILLINOIS.

HAY RAKE AND LOADER.

SPECIFICATION forming part of Letters Patent No. 357,446, dated February 8, 1887.

Application filed April 25, 1884. Serial No. 129,219. (No model.)

*To all whom it may concern:*

Be it known that we, WILLIAM BADER and BENJAMIN F. BADER, citizens of the United States, residing at Baders, in the county of Schuyler and State of Illinois, have invented certain new and useful Improvements in Hay Rakers and Loaders; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to hay rakes and loaders in which a long carrier-belt is used which has not any hay-gathering teeth, in combination with an auxiliary belt which is provided with gathering-teeth and is shorter than the carrier-belt, so that its teeth will not interfere with the discharge of the hay; and our invention consists in constructions and combinations hereinafter described and claimed.

In the accompanying drawings, which illustrate our invention, Figure 1 is a side elevation; Fig. 2, a top plan; Fig. 3, a sectional elevation in the line $x\ x$ in Fig. 2; Fig. 4, a side elevation of the drive-shaft and the sprocket-wheels mounted thereon. Fig. 5 is a plan, the upper parts broken away to show the belt-operating mechanism.

Referring to the parts by letters, the same letter indicating the same part in the different figures, letters A represent the frame on which the working parts are mounted. The frame A consists, mainly, of three parts—the elevator part A', the rake-supporting part A", and the draft part A''', by which it is secured to a hay-wagon or other vehicle, behind which it is drawn in the usual manner.

B is the drive-shaft or axle, journaled in bearings near where the parts A' and A''' of the frame A are united.

C are the supporting-wheels, loosely mounted on the drive-shaft B, and connected therewith in the ordinary manner, so that the forward rotation of the wheels alone gives motion to the drive-shaft B.

D is a counter-shaft, journaled in bearings in the part A' of the frame A a short distance in front of the shaft B. The shaft D has fixed to one of its ends a sprocket-wheel, $d$, which gears by a chain belt, $d'$, with a sprocket-wheel, $b$, which is fixed upon the drive-shaft B, by which means the shaft D is rotated by the forward movement of the machine. An idler-pulley, $d'''$, keeps the belt $d'$ taut. The shaft D has also sprocket-wheels $d''$ fixed thereon, one near each of its ends.

E E are sprocket-wheels, loosely journaled so that they may rotate on the drive-shaft B. Each wheel E has two sets of sprockets, $e\ e'$, as shown plainly at Fig. 4. Each wheel $d''$ is geared by a chain belt, F, with one set, $e$, of the sprockets on each wheel E, so that the sprocket-wheels E are rotated by the rotating shaft D. Each sprocket $e'$ carries and operates a chain belt, G, and each belt G passes around a pulley, H, at the upper end of the elevator-frame A'. The belts G are provided with carrier-slats $g$, which do not have any gathering-teeth. The chain belts F carry slats $f$, which are provided with ordinary hay-gathering teeth $f'$.

By the foregoing arrangement the wheels C rotate the shaft B and sprocket $b$, which in turn rotates the shaft D and sprockets $d''$, that are geared with and rotate the double sprockets E, and the relative sizes and number of teeth of the sprocket-wheels are such that the sprockets E rotate with much more velocity than the drive-shaft B and its sprocket $b$; hence the belts F and G are driven with greater velocity than could be given them if geared directly with the drive-shaft B. The belts F and G are given equal velocity by means of the similar sprockets $e\ e'$, and the sprockets $e\ e'$ being of the same diameter, the paths of the slats on the belts F and G are the same at the lower and rear sides of the sprockets E.

The rake-supporting frame A" is connected at its upper end by a bar, $a$. The rake-head H' is journaled in the frame A" below the bar $a$, and is provided with ordinary curved rake-teeth, $h$, with hay-guards $h'$. A spring, I, secured to the bar $a$ at one end and to the rake-head H' at its other end, holds the rake-teeth down with a yielding pressure.

J J are strips of spring-steel, secured at one end to the bar $a$, curved as shown, and extended forward above the belt G, to act as a guard in retaining the hay on said belt, especially when the wind is blowing. A guard-bar, K, extends forward from each frame-bar A'' above and at the sides of the belt G, and these guard-bars K approach each other toward their outer or upper ends, so that they will tend to press the hay toward the center of the belt as it (the hay) is elevated.

The guard-bars K are provided with fingers $k$, which project inward and upward, as shown, from each guard-bar, and aid in pressing the hay toward the middle or central part of the belt G. Guard-arms L also project forward over the belt G from the rear end of the frame A''', and further assist in keeping the hay from spreading at the sides of the belt G by forcing it toward the central part of said belt.

The rake-teeth $h$ operate in rear of the belts, and the hay is forced up between the rake-teeth and belts in the ordinary manner, except that the increased velocity of the belts greatly facilitates the operation, and causes the belts to gather the hay much cleaner than is done with the ordinary velocity.

The teeth on the belt F project outward beyond the belt G and lift the hay and carry it up so far beyond the vertical part of its path that the belt G, without teeth, will carry it to its upper end, where it is discharged without that interference from the teeth which is common in the use of belts with teeth.

Any ordinary means may be used to raise and lower the rake-teeth.

Having thus described our invention, what we claim as new, and desire to secure by Letters Patent, is—

1. In combination, the drive-shaft B, provided with fixed sprocket-wheel $b$ and loose double sprocket-wheels E, counter-shaft D, provided with sprocket-wheels $d\ d''$, belt F, with teeth $f'$, and belt G, without teeth, substantially as and for the purpose specified.

2. In combination, the drive-shaft B, wheels C, sprocket-wheel $b$, fixed to the shaft B, shaft D and sprocket-wheels $d\ d''$, the latter of longer diameter than the former, fixed thereon, sprocket-wheels E, loose on shaft B, and belt G, whereby increased velocity is imparted to said belt G, substantially as and for the purpose specified.

3. In combination, the drive-shaft B, provided with fixed sprocket-wheel $b$ and loose sprocket-wheels E, counter-shaft D, provided with sprocket-wheels $d\ d''$, belt F, with teeth $f'$, belt G, without teeth, and guard-arms K, having inclined teeth $k$, substantially as described.

4. In combination, the drive shaft B, provided with fixed sprocket-wheel $b$ and loose sprocket-wheels E, counter-shaft D, provided with sprocket-wheels $d\ d''$, belt F, with teeth $f'$, belt G, without teeth, and guard-arms L, converging toward their upper ends, substantially as described.

In testimony whereof we affix our signatures in presence of two witnesses.

WILLIAM BADER.
BENJAMIN F. BADER.

Witnesses:
MARCUS M. CLARK,
PATRICK H. WILLARD.